Patented June 18, 1929.

1,717,796

UNITED STATES PATENT OFFICE.

ROBERT A. MARR, OF NORFOLK, VIRGINIA.

PROCESS OF MAKING PULP.

No Drawing. Application filed February 2, 1923, Serial No. 616,610. Renewed September 3, 1926.

The present invention relates to the production of pulp, paper, pulp board, carton stock, and various other pulp or fibre products by the use of a novel and extremely cheap digestive solution. The solution for use in the present invention contains as its novel and essential ingredient kainit, $K_2SO_4.MgSO_4.MgCl_2.6H_2O$, this material being a double sulfate of potassium and magnesium combined with magnesium chloride. The material has been used for a long time as a potash fertilizer, and usually contains from 12 to 15% of $K_2O$. A particular batch of this material which I have used successfully in making tests, was found to contain 13.7% of $K_2O$, being a moderately high grade kainit sold to fertilizer manufacturers for use in making mixed fertilizer or for use directly on land needing potash. The material possesses the advantage of being extremely cheap, considering its content of potassium sulfate and magnesium sulfate, being commonly sold on the basis of its content of $K_2O$.

I have found that for digesting wood of all kinds, including coniferous woods, and woods of the broad leafed varieties, for digesting cane, bamboo, sedges, and other marsh growths, straw, and the like, very satisfactory results can be secured. The preferred initial solution may contain about 3 ounces of the crude kainit per gallon of water, which would amount to about 2.4%. Various concentrations, from about 1.2% up to 4% (1.5 to 5 ounces per gallon) can be satisfactorily employed. One may even employ a solution of below 1.2% concentration, the time of digestion being longer than above stated. It is recommended not to employ solutions stronger than about 4%, since such solutions are sometimes liable to injure the product, and are also somewhat wasteful. The same digestive solution can be used over several times, and it is advisable, after using about four or five times, to purify the solution in any suitable manner, or else to evaporate the solution to dryness, after which it can be used for fertilizer or for an ingredient of fertilizer. A possible manner of rejuvenating the solution, after cooking therein about four or five times, would be to add a small percentage of sulphuric acid, say about 1%, and to then boil the solution for an hour or two, after which it can be neutralized, if desired, or substantially neutralized, by the addition of soda ash, potassium carbonate, double manure salt (a double carbonate of potassium and magnesium) or other alkali.

When it is desired to use the solution over several times, it is advisable to add a small amount of kainit after each second or third cook, and also to add more water to make up for the loss of liquids both by a mechanical loss, loss of chemicals (due to more or less of the same being carried off in the cooked material) and evaporation of water.

As to the conditions of cooking, I have found that for most purposes it is sufficient to run the pressure up to about 100 pounds per square inch and to maintain this pressure for about an hour, after which the material can be cooled off until the pressure is at about atmospheric, the solution then drawn off from the digestor, or the cooked material withdrawn from the digestor, and the liquor can then be again used for the next cook.

The solution containing kainit may contain other digestive chemicals, if desired, for example, sodium sulfate, copper sulfate, additional amounts of potassium sulfate, zinc sulfate, alum (which may be produced by heating and leaching alunite) iron sulfate or the like.

The wood, cane, marsh growth, straw, or the like to be cooked can be either in the green or dry condition. However, it is found that there seems to be a substantial advantage in using green materials, these giving stronger and more elastic products than dried materials, particularly materials which have been kiln-dried.

The vegetable materials above referred to or other vegetable materials can be treated singly or in the form of mixtures, or several different materials can be separately cooked in the same batch of liquor at the same time, by providing cages or the like. The following examples are given for the purpose of more fully illustrating the invention:

Example 1.

A solution of 3 ounces of kainit per gallon of water was made up, the kainit used containing 13.7% of $K_2O$. About 9 pounds of vegetable matter was used to each four gallons of water, in this run, the vegetable matter containing for each 9 pounds, 3½ pounds of green cane direct from the swamp with leaves and sheaths carried thereby; 2 pounds of green cane which had been stripped, 2 pounds of green Western pine, 1½ pounds of green gum. The pine and gum were in the form of blocks 4 inches long by 2½ inches thick and 3 inches wide. The cane was cut into lengths about a foot long. The four materials above referred to, were put into separate wire mesh containers, and placed in the digestor, the solution being already hot. The liquid was then heated in the digester until the pressure in the digester had gone up to about 100 pounds, and this condition was then maintained for about ¾ of an hour. The material in the digester was then allowed to cool to about atmospheric pressure, and the separate cages of cooked material were taken out and examined. In this run, the heat was applied for raising the temperature during about 1¾ hours. The pressure of 100 pounds was maintained for ¾ of an hour and the material allowed to cool for about 1¼ hours.

Each of the four materials were then separately run through a crusher, and a pulper, with water, and the pulp was beaten for one-half hour in a beating engine, and sheets were made from each one of the four materials, and also from various mixtures of these materials.

*Example 2.*

In the liquor remaining from the first experiment was placed, three pounds of green pitch pine, two pounds of green Western pine, and one pound six ounces of green gum (to each 4 gallons of liquor). The material was heated until pressure of 120 pounds showed on the gauge on the digestor and this pressure was maintained for about one hour and the solution and material allowed to cool.

Each of the cooked materials was then run through crushing rolls, then through a pulper and was then beaten in the usual way and sheeted.

*Example 3.*

To the liquor remaining from Example 2, about 1 ounce of kainit per gallon of liquor was added, and a number of pieces of wood were placed in the solution and these were then digested running the pressure up to 100 pounds in an hour, maintaining 100 pounds pressure for an hour, and then allowing the solution to cool until substantially atmospheric pressure existed in the digestor. About 7 pounds of wood were used to each 4 gallons of solution. The woods used in this run were hickory, green Western pine, green old field pine, dry black gum, green swamp gum, and dry Western pine, in blocks averaging 20 to 40 cubic inches each.

After cooking, the pieces of wood were worked up as above referred to. In each of the above examples, green Western pine was used as one of the materials. This was for the purpose of determining whether there was any deterioration due to the repeated use of the same solution. Tests showed that the product of the third cook in the same liquor were every bit as good as the product of the first cook.

In other tests which I have made, I have used kainit and magnesium sulfate together, kainit and sodium sulfate together, kainit and zinc sulfate together. Especially favorable results have been produced by cooking mixtures of green cane, and green gum, or green pine, say 65 to 75% of the cane material to 25 or 35% of the wood. In both of these cases, products are formed which are very strong when sheeted, thick sheets of these materials can be used for making shoe counters, suit cases, trunks, packing boxes and the like. In some cases it is advisable to digest the cane material in a solution of kainit and to digest the wood material in a solution of copper sulfate or iron sulfate, either alone or mixed with sodium sulfate or zinc sulfate. By the use of this process I can readily produce a yield of 80 or 85% of the dry matter of the vegetable material digested. As an example of this, I cite a particular experiment in which 92 cubic inches of wood were used, containing 21 ounces of dry matter, from which I produced 19 ounces of finished pulp (over 90% yield).

While the term "cooking" as used in the pulp-making art has frequently been used as referring to processes in which wood chips are boiled up in a digestive solution which converts the chips directly into a pulp, by destroying or dissolving the cementitious mattter, it is to be understood that in the present case, the term "cooking" is used to designate a digestive treatment wherein the pieces of woody material or equivalent, are not necessarily broken into a pulp. In the above examples pieces of wood, cane etc. after the cooking, are found not to have been reduced to a pulp during such operation, and in fact they are usually left intact during the cooking. The term "cooking" obvious implies heating in the liquor to about the boiling point of the latter, under pressure, as is well understood in this art.

The term "kainit" as used in the appended claims is intended to cover any crude material, containing not substantially less than 12% of $K_2O$, such as various mixtures of salts produced from the Stassfurt deposits or other like deposits elsewhere, or prepared artificially, in which a large proportion of the metals exist in the form of soluble sulfates.

As in my co-pending cases 407,759 and 616,609, it is advisable to soak the cooked material in water, several hours, after the cooking operation, before reducing the same to a pulp.

I claim:

1. A process which comprises cooking cellulosic and ligneous material in a solution containing sulfates of magnesium and potassium.

2. A process which comprises cooking cellulosic and ligneous material in a solution containing sulfates of magnesium and potassium combined with a chlorid.

3. A process which comprises cooking several successive batches of cellulosic and ligneous material in a solution containing sulfates of magnesium and potassium.

4. A process which comprises cooking cellulosic and ligneous material in a solution containing kainit.

5. A process which comprises cooking green cellulosic and ligneous material in a solution containing sulfates of magnesium and potassium.

6. A process which comprises cooking cellulosic and ligneous material in a solution containing about 1.2 to 4% of kainit.

7. A process which comprises cooking cellulosic and ligneous material in a solution containing about 2 to 3% of kainit.

8. A process which comprises cooking under pressure above atmospheric, cellulosic and ligneous material in a digestive liquor containing kainit dissolved in water, and thereafter mechanically reducing the cooked material to the form of a pulp.

9. The herein described improvement which comprises cooking cellulosic and ligneous material in a solution of potassium salt of a grade and kind ordinarily used in fertilizer.

10. The herein described improvement which comprises cooking cellulosic and ligneous material in a solution of a potassium salt of not substantially above 1.2% strength.

11. A process which comprises digesting under superatmospheric pressure, cellulosic and ligneous material in a hot aqueous solution containing salts of an alkali metal and of magnesium, such solution being of a concentration not substantially above 1.2%, until the intercellular cementitious matter is rendered readily friable, and thereafter crushing said material while wet.

In testimony whereof I affix my signature.

ROBERT A. MARR.